United States Patent
Yu et al.

(10) Patent No.: US 9,074,684 B2
(45) Date of Patent: Jul. 7, 2015

(54) TRANSMISSION GEAR SHIFT INDICATION TECHNIQUES

(71) Applicants: Songping Yu, Troy, MI (US); Mohamed Othman, Troy, MI (US); Ryan B McNamara, Lakeshore, CA (US); Sean King, Harrison Township, MI (US)

(72) Inventors: Songping Yu, Troy, MI (US); Mohamed Othman, Troy, MI (US); Ryan B McNamara, Lakeshore, CA (US); Sean King, Harrison Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/034,598

(22) Filed: Sep. 24, 2013

(65) Prior Publication Data

US 2015/0088392 A1 Mar. 26, 2015

(51) Int. Cl.
  *F16H 61/68* (2006.01)
  *F16H 59/44* (2006.01)
  *F16H 61/00* (2006.01)
  *F16H 61/02* (2006.01)

(52) U.S. Cl.
  CPC ............. *F16H 61/68* (2013.01); *F16H 59/44* (2013.01); *F16H 2061/0015* (2013.01); *F16H 2061/022* (2013.01)

(58) Field of Classification Search
  CPC ............................................. F16H 2061/022
  See application file for complete search history.

(56) References Cited

U.S. PATENT DOCUMENTS

| | | | |
|---|---|---|---|
| 4,463,427 A * | 7/1984 | Bonnetain et al. ............ 701/123 |
| 4,539,868 A | 9/1985 | Habu | |
| 4,622,637 A | 11/1986 | Tomita et al. | |
| 4,703,304 A * | 10/1987 | Muguruma et al. .......... 340/439 |
| 4,853,673 A * | 8/1989 | Kido et al. ..................... 340/439 |
| 5,017,916 A * | 5/1991 | Londt et al. ............. 340/870.13 |
| 6,356,831 B1 * | 3/2002 | Michelini et al. ............... 701/56 |
| 7,512,477 B2 | 3/2009 | Quigley et al. | |
| 2004/0148084 A1* | 7/2004 | Minami ........................ 701/55 |
| 2012/0143451 A1* | 6/2012 | Nishida et al. .................. 701/52 |

* cited by examiner

*Primary Examiner* — Ramya Burgess
*Assistant Examiner* — Mark Manley
(74) *Attorney, Agent, or Firm* — Ralph E. Smith

(57) ABSTRACT

Transmission gear shift control techniques can include calculating, at a controller of a vehicle powered by an internal combustion engine, the controller including one or more processors, brake specific fuel consumption (BSFC) for each of: (i) a current gear of a transmission of the vehicle, (ii) a lower gear than the current gear of the transmission, and (iii) a higher gear than the current gear of the transmission, wherein the transmission is one of a manual transmission and an automatic transmission operating in a manual mode. The techniques can include determining, at the controller, which of the current gear, the lower gear, and the higher gear has a smallest BSFC to obtain a desired gear of the transmission. The techniques can also include outputting, from the controller, an indication to shift the transmission to the desired gear.

17 Claims, 4 Drawing Sheets

TRANSMISSION GEAR SHIFT INDICATION TECHNIQUES

FIELD

The present disclosure relates generally to vehicles and, more particularly, to transmission gear shift indication techniques.

BACKGROUND

A vehicle can include an internal combustion engine or other suitable device that generates drive torque. The drive torque can be transferred from the engine to a drivetrain of the vehicle (a prop shaft differential, a power transfer unit, drive shafts, etc.) to one or more wheels via a transmission. Examples of transmissions include manual transmissions and automatic transmissions. Manual transmissions require a driver of the vehicle to manually shift the transmission between their various gears. Automatic transmissions, on the other hand, can automatically shift between their various gears based on various operating parameters. Some automatic transmissions, however, include a manual mode in which the driver can manually shift between the various gears similar to a manual transmission.

SUMMARY

In one form, a method is provided in accordance with the teachings of the present disclosure. The method can include calculating, at a controller of a vehicle powered by an engine, the controller including one or more processors, brake specific fuel consumption (BSFC) for each of: (i) a current gear of a transmission of the vehicle, (ii) a lower gear than the current gear of the transmission, and (iii) a higher gear than the current gear of the transmission, wherein the transmission is one of a manual transmission and an automatic transmission operating in a manual mode. The method can include determining, at the controller, which of the current gear, the lower gear, and the higher gear has a smallest BSFC to obtain a desired gear of the transmission. The method can also include outputting, from the controller, an indication to shift the transmission to the desired gear.

In another form, a method is provided in accordance with the teachings of the present disclosure. The method can include determining, at a controller of a vehicle powered by an internal combustion engine, the controller including one or more processors, whether a gear shift of a transmission of the vehicle is occurring, wherein the transmission is a manual transmission or an automatic transmission operating in a manual mode. The method can include determining, at the controller, whether both an engine speed and a vehicle speed have not changed by more than respective predetermined thresholds during respective predetermined periods in response to determining that the gear shift of the transmission is not occurring. The method can include calculating, at the controller, brake specific fuel consumption (BSFC) for each of (i) a current gear of the transmission, (ii) a lower gear than the current gear of the transmission, and (iii) a higher gear than the current gear of the transmission, in response to determining that the both the engine speed and the vehicle speed have not changed by more than respective predetermined thresholds during respective predetermined periods. The method can include determining, at the controller, which of the current gear, the lower gear, and the higher gear has a smallest BSFC to obtain a desired gear for the transmission. The method can also include outputting, from the controller, an indication to shift the transmission to the desired gear when the BSFC for the desired gear is less than the BSFC for the current gear by greater than a predetermined threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
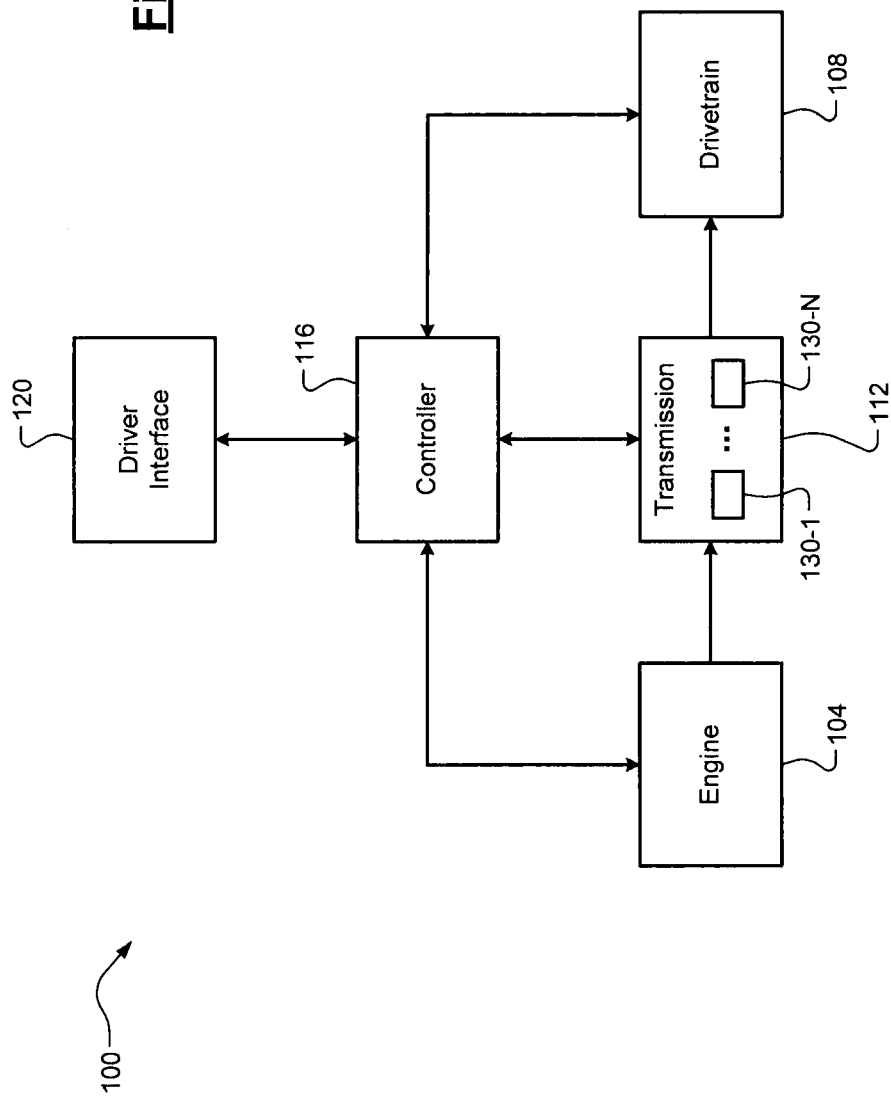
FIG. 1 is a functional block diagram of an exemplary vehicle according to the principles of the present disclosure.

As previously described, both manual transmissions and automatic transmissions operating in a manual mode allow a driver of a vehicle to manually shift between the various gears of the transmission. The gear selected by the driver, however, may not be an optimal gear for maximizing a fuel efficiency of an engine of the vehicle. For example, the driver may be purposely driving the vehicle aggressively, or the driver may be unaware that the current gear is not the optimal gear for maximizing fuel efficiency.

Accordingly, techniques are presented for transmission gear shift indication. The techniques include providing an indication to shift to a desired gear and thereby increase a fuel efficiency of the vehicle. The techniques can determine brake specific fuel consumption (BSFC) for each of a current gear, a lower gear than the current gear, and a higher gear than the current gear. The BSFC can represent a fuel efficiency of the engine, or a rate of fuel consumption of the engine divided by a power produced by the engine. It should be appreciated that BSFC is one example of a fuel efficiency of the engine and other suitable fuel efficiency parameters can be used.

The techniques can determine which of the current gear, the lower gear, and the higher gear has a smallest BSFC to obtain a desired gear. In some implementations, the indication to shift to the desired gear may be output when the BSFC for the desired gear is less than the BSFC for the current gear by greater than a predetermined threshold. By utilizing this predetermined threshold, repeated changes in the desired gear and the corresponding indication to shift can be avoided, which can be undesirable to the driver of the vehicle.

The indication can be provided to the driver as a suggestion via a driver interface (a light, a gauge, a display, etc.). When the transmission is an automatic transmission operating in the manual mode, the indication may cause the automatic transmission to automatically shift to the desired gear. Other conditions may be required before calculating the BSFCs and, if appropriate, before providing the indication, such as stable engine speed and/or vehicle speed, and/or a gear shift of the transmission not occurring.

The gear shift indication techniques of the present disclosure assume the following conditions: (i) a same vehicle speed for every gear, (ii) a same wheel torque for every gear, (iii) a same pedal position for every gear, and (iv) all accessories/loads associated with the engine (air conditioner, alternator, oil pump, etc.) are adjusted/recalculated for each gear with the assumption that each accessory/load is maintaining its same output as in the current gear. By assuming these conditions, the BSFC can be calculated for lower/higher gears of the transmission 112 based on parameters, e.g., engine load/speed/temperature, measured while in the current gear of the transmission 112. These assumptions are reflected in the various conditions that may be required before performing the gear shift indication techniques, which are described in further detail below.

Referring now to FIG. 1, a functional block diagram of an exemplary vehicle 100 is illustrated. The vehicle 100 can include an internal combustion engine 104 that generates drive torque. While the vehicle 100 is shown to be powered by the engine 104, it should be appreciated that other suitable devices can be implemented, e.g., an electric motor. In vehicles having alternate devices, however, the techniques of the present disclosure could be modified to utilize an operation efficiency parameter other than BSFC. The drive torque generated by the engine 104 can be transferred to a drivetrain 108 of the vehicle 100 to one or more wheels via a transmission 112. The drivetrain 108 can include any suitable drivetrain components (a prop shaft differential, a power transfer unit, drive shafts, etc.).

The transmission 112 can be a manual transmission or an automatic transmission having a manual mode. It should be noted, however, that the techniques only apply to the automatic transmission when it is operating in the manual mode. The transmission 112 can include a plurality of gears 130-1 . . . 130-N (N>1, collectively "gears 130"), each having a different gear ratio. For example only, the transmission 112 may include three or more different gears 130 (N>3). It should be appreciated, however, that the transmission 112 could include two different gears 130 (N=2).

The term "current gear" can refer to one of the gears 130 of the transmission 112 that is currently engaged between a crankshaft of the engine 104 and the drivetrain 108. The term "lower gear" can refer to either a lower numbered gear, e.g., third gear compared to the current fourth gear, or a gear having a lower gear ratio than the current gear. Similarly, the term "higher gear" can refer to either a higher numbered gear, e.g., fifth gear compared to the current fourth gear, or a gear having a higher gear ratio than the current gear. The term "consecutive gears" can refer to consecutively numbered gears, e.g., third, fourth, and fifth gears, or fifth, fourth, and third gears.

The vehicle 100 can also include a controller 116 that can control operation of the vehicle 100. Specifically, the controller 116 can control the engine 104 based on a torque request via a driver interface 120 to achieve a desired drive torque. The driver interface 120 can include any suitable components for interpreting a torque request from the driver of the vehicle, e.g., an accelerator pedal. The driver interface 120 can also include other suitable components for communication with the driver of the vehicle 100 (gauges, displays, integrated instrument panel display/gauge, etc.). Specifically, the driver interface 120 can include an indicator light or a display for providing the transmission gear shift indication according to the techniques of the present disclosure, which are described in further detail below.

Figure 2:
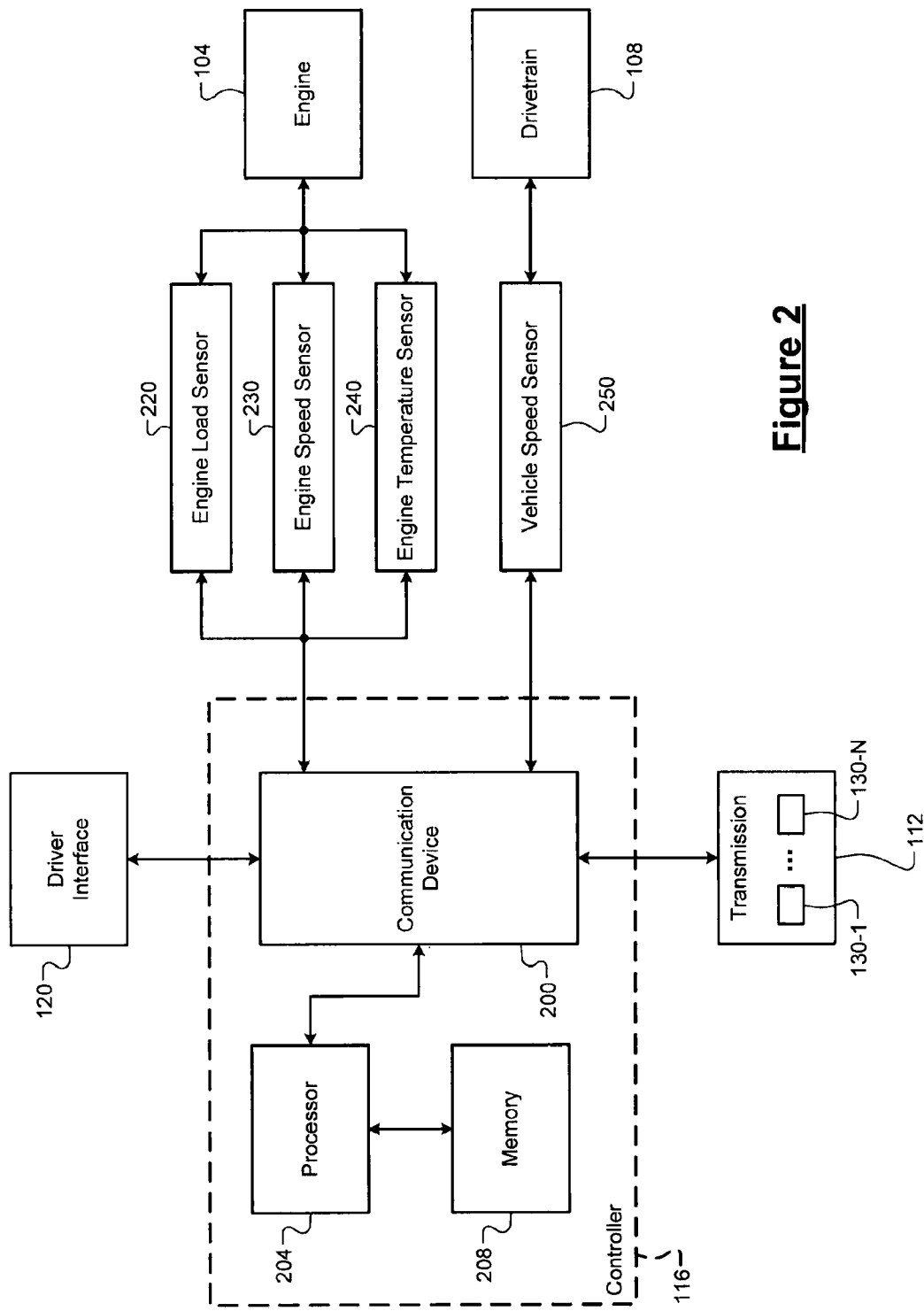
FIG. 2 is a functional block diagram of a controller of the vehicle according to the principles of the present disclosure.

Referring now to FIG. 2, a functional block diagram of the controller 116 is illustrated. The controller 116 can include a communication device 200, a processor 204, and a memory 208. The controller 116 can communicate (via the communication device 200) with other suitable components of the vehicle 100, such as an engine load sensor 220, an engine speed sensor 230, an engine temperature sensor 240, and a vehicle speed sensor 250. While these sensors are shown as being separate from the controller 116, it should be appreciated that one or more of these sensors could be included as part of the controller 116 or another controller.

The communication device 200 can include any suitable components for communication via a controller area network (CAN) of the vehicle 100 (a transceiver, an analog-to-digital converter (ADC), etc.). The communication device 200 can receive measurements from the engine load sensor 220, the engine speed sensor 230, the engine temperature sensor 240, and/or the vehicle speed sensor 250. The communication device 200 can also communicate with the driver interface 120 to receive input from the driver of the vehicle and/or to output the indication to shift the transmission 112, e.g., via an indicator light, a display, or another suitable component of the driver interface 120. The communication device 200 can also communicate with the transmission 112 to determine a current gear and/or, in the case of an automatic transmission operating in the manual mode, to transmit a command that causes the transmission 112 to automatically shift to the desired gear.

The engine load sensor 220 can be any suitable sensor configured to measure a load of the engine 104 (a mass air flow (MAF) sensor, a manifold absolute pressure (MAP) sensor, etc.). The load of the engine 104 can also be referred to as a "charge" or "air charge" of the engine 104, which indicates an amount of air digested by the engine 104. The engine speed sensor 230 can be any suitable sensor configured to measure a rotational speed of the engine 104, e.g., a crankshaft speed sensor. The engine temperature sensor 240 can be any suitable sensor configured to measure a temperature of the engine 104 (an engine coolant temperature (ECT) sensor, an engine oil temperature (EOT) sensor, etc.). The vehicle speed sensor 250 can be any suitable sensor configured to measure a speed of the vehicle 100 or, more specifically, the drivetrain 108, (a transmission output shaft speed (TOSS) sensor, an anti-lock braking system (ABS) wheel sensor, etc.).

The processor 204 can control operation of the controller 116. The processor 204 can perform functions including, but not limited to, loading/executing an operating system of the controller 116, controlling communication with other components of the vehicle 100 (or other suitable components) via the communication device 200, and controlling read/write operations at the memory 208. The memory 208 can be any suitable storage medium configured to store information at the controller 116 (flash, hard disk, etc.). The processor 204 can also be configured to perform all or a portion of the transmission gear shift indication techniques of the present disclosure, which are described in detail below.

In some implementations, the processor 204 can determine whether various conditions are satisfied before calculating BSFC for various gears of the transmission 112. The processor 204 can determine whether a gear shift of the transmission 112 is occurring. If a gear shift of the transmission 112 is occurring, the processor 204 can wait to perform the transmission gear shift indication techniques until the gear shift has completed. The processor 204 can also determine whether engine speed and vehicle speed are both stable. Engine speed and vehicle speed can be measured by the engine speed sensor 230 and the vehicle speed sensor 250, respectively, and received at the processor 204 via the communication device 200.

The processor 204 can determine that engine speed and vehicle speed are stable when the values have not changed by more than respective predetermined amounts during respective predetermined periods. For example, the predetermined amounts could be a few hundred revolutions per minute (RPM) and the predetermined periods could be a few seconds. If the processor 204 determines that at least one of the engine speed and the vehicle speed is not stable, the processor 204 can wait to perform the transmission gear shift indication techniques until both the engine speed and the vehicle speed have stabilized. By waiting for engine speed and vehicle speed to be stable, the processor 204 can avoid less definite gear shift indications for transitional vehicle operations.

The processor 204 can then determine BSFC for each of (i) a current gear of the transmission 112, (ii) a lower gear of the transmission 112, and (iii) a higher gear of the transmission 112. In some cases, the lower gear, the current gear, and the higher gear can be consecutive gears, e.g., third, fourth, and fifth gears, respectively. It should be appreciated, however, that the lower gear and/or the higher gear could be two or more gears from the current gear, e.g., third gear vs. fifth gear or second gear vs. fourth gear. For example, the driver could be purposely driving the vehicle 100 in an aggressive manner and therefore the current gear could be more than one gear from the desired gear.

As previously mentioned, BSFC represents fuel consumption of the engine 104 divided by power generated by the engine 104. More specifically, BSFC inversely corresponds to the efficiency of a shaft reciprocating engine, i.e., engine 104. In other words, a lower BSFC represents a higher efficiency of the engine 104, which corresponds to increased fuel economy. The power generated by the engine 104 can be determined by calculating a product of engine torque and engine speed. The engine torque can be determined based on the engine load using dynamometer test data, which can be compiled in a look-up table and stored at the memory 208.

The BSFC can be based further on an energy density of a fuel being used by the engine 104, and the energy density of the fuel being used is further dependent upon the fuel's heating value. In other words, at a specific operating temperature the BSFC can be calculated based on engine torque and engine speed. Therefore, the BSFC can be determined based further upon the temperature of the engine 104. The temperature could be used as an adjustment to the calculated BSFC or could be included as an additional parameter in the dynamometer test data stored at the memory 208. For example, when the engine temperature sensor 240 measures the ECT, the ECT can be input to a calibration table, which can then output a compensation value for the BSFC calculations.

The calculated BSFC value can be associated with the current gear of the transmission 112. Without having to shift to the lower gear or the higher gear of the transmission 112, the processor 204 can calculate the engine load and engine speed for the lower/higher gears using the engine load and engine speed for the current gear and the known gear ratios between the current gear and the lower/higher gears. The processor 204 can also account for friction loss of the drivetrain 108 in calculating these parameters for the lower/higher gears. Incorporating the friction loss of the drivetrain 108 can avoid providing a gear shift indication when the friction loss in the desired gear outweighs the gain in engine efficiency in the desired gear. The engine torque for the lower/higher gears can then be calculated using the engine load for the lower/higher gears and the dynamometer test data stored at the memory 208. Also, the BSFC for the lower and higher gears can then be calculated based further on the temperature of the engine 104, as discussed above.

After determining the BSFC for the current gear, the lower gear, and the higher gear, the processor 204 can determine which of the current gear, the lower gear, and the higher gear has the lowest BSFC to obtain the desired gear of the transmission 112. As previously mentioned, the BSFC inversely corresponds to the efficiency of the engine 104, so a lower BSFC value corresponds to a higher efficiency of the engine 104 and thus an increased fuel economy. Once the desired gear of the transmission 112 is determined, the processor 204 can output an indication to shift the transmission 112 to the desired gear.

In the case of a manual transmission, the indication can be a suggestion to the driver, and could be output at the driver interface 120 (indicator light, display, etc.) via the communication device 200. In the case of an automatic transmission operating in the manual mode, the indication can be the suggestion at the driver interface 120 and/or the indication can be transmitted to the transmission 112 and can cause the transmission 112 to automatically shift to the desired gear.

In addition to the conditions described as prerequisites to calculating the BSFCs and determining the desired gear, the processor 204 can gate the BSFCs using a predetermined threshold in determining the desired gear or outputting the indication. More specifically, the processor 204 can determine whether the BSFC for the desired gear is less than the BSFC for the current gear by more than the predetermined threshold. By utilizing the predetermined threshold, the processor 204 can avoid the indication to shift the transmission 112 being provided repeatedly during a particular period, which may be undesirable to the driver of the vehicle 100.

As previously mentioned, the lower gear, the current gear, and the higher gear can be consecutive or non-consecutive gears. The processor 204 can also calculate BSFC for other gears in addition to the current gear, the lower gear, and the higher gear, e.g., a next lower gear and/or a next higher gear. It should be appreciated that in some implementations, the processor 204 could calculate BSFC for every gear of the transmission 112 and then determine the desired gear to be the gear having a smallest BSFC.

It should also be appreciated that in some implementations, the processor 204 may only calculate BSFC for the current gear and one other gear of the transmission 112. For example only, the transmission 112 could have only two gears and thus a single gear-to-gear comparison would be sufficient. The one other gear could be either a consecutive lower or higher gear or a non-consecutive lower or higher gear. In this manner, the processor 204 can determine whether the current gear is more fuel efficient than the one other gear of the transmission 112. This single gear-to-gear comparison could then be repeated if the current gear is determined to be more fuel efficient, e.g., by determining whether the other consecutive lower/higher gear is more fuel efficient.

Figure 3:
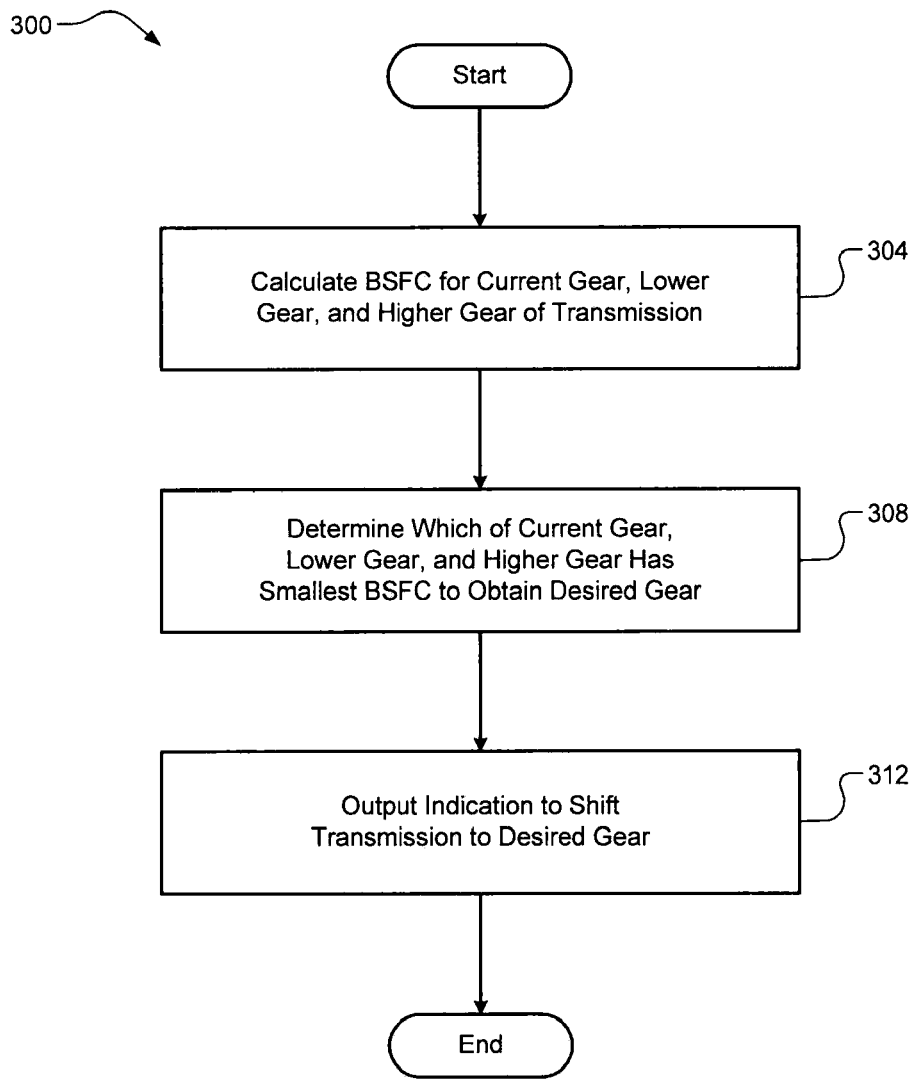
FIG. 3 is a flow diagram of a method of transmission gear shift indication according to the principles of the present disclosure.

Referring now to FIG. 3, a flow diagram of a method 300 for transmission gear shift indication is illustrated. At 304, the controller 116 can calculate BSFC for each of: (i) a current gear of the transmission 112, (ii) a lower gear than the current gear of the transmission 112, and (iii) a higher gear than the current gear of the transmission 112. At 308, the controller 116 can determine which of the current gear, the lower gear, and the higher gear has a smallest BSFC to obtain a desired gear of the transmission 112. At 312, the controller 116 can output an indication to shift the transmission 112 to the desired gear. The method 300 can then end or return to 304 for one or more additional cycles.

Figure 4:
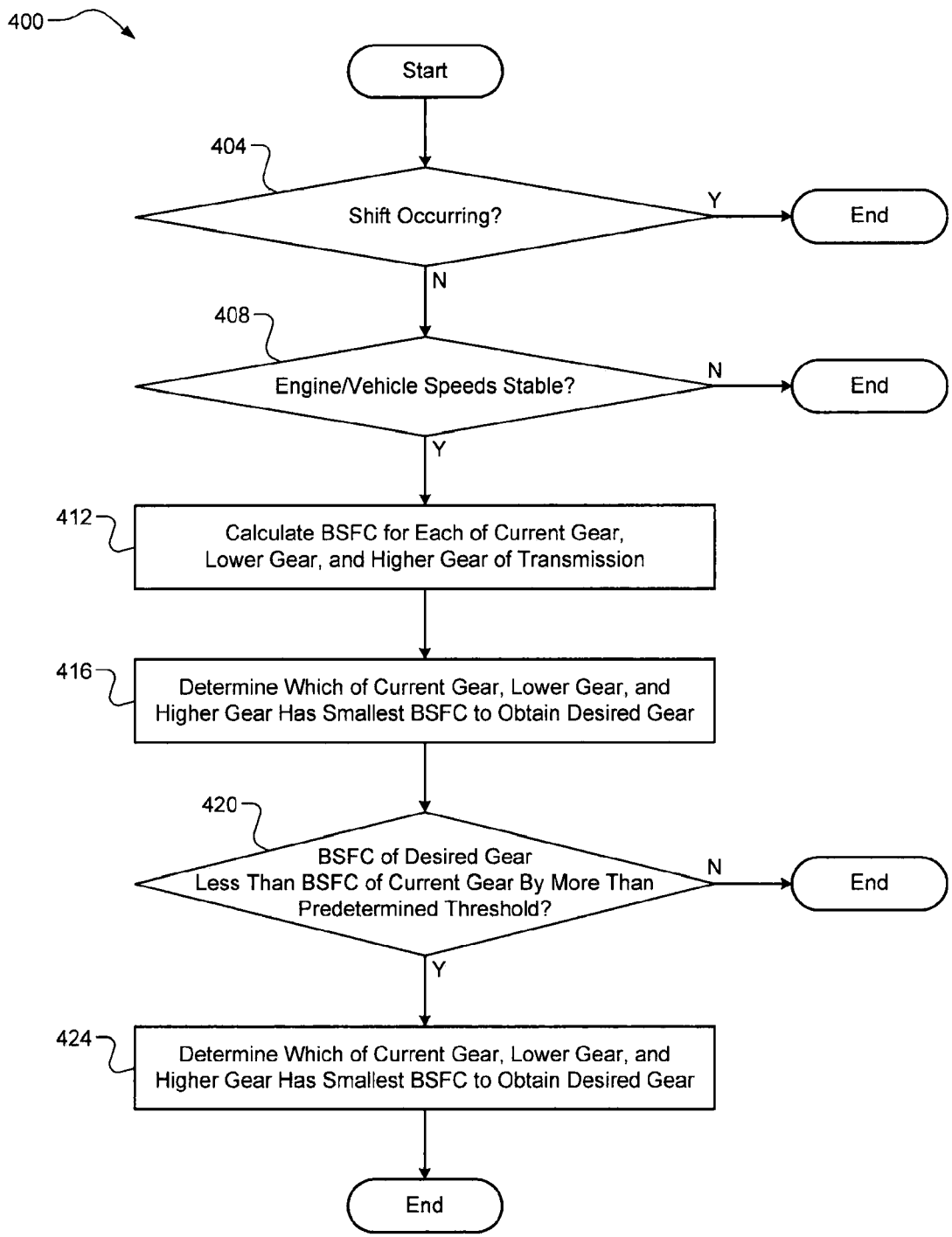
FIG. 4 is a flow diagram of another method of transmission gear shift indication according to the principles of the present disclosure.

Referring now to FIG. 4, a flow diagram of another method 400 for transmission gear shift indication is illustrated. At 404, the controller 116 can determine whether a gear shift of a transmission 112 is occurring. If true, the method 400 can end or return to 404 and wait for the gear shift to complete. If false, the method 400 can proceed to 408. At 408, the controller 116 can determine whether both an engine speed and a vehicle speed have not changed by more than respective predetermined thresholds during respective predetermined periods. If false, the method 400 can end or return to 404 or 408 and wait for the engine speed and/or vehicle speed to stabilize. If true, the method 400 can proceed to 412.

At 412, the controller 116 can calculate BSFC for each of (i) a current gear of the transmission 112, (ii) a lower gear than the current gear of the transmission 112, and (iii) a higher gear than the current gear of the transmission 112. At 416, the controller 116 can determine which of the current gear, the lower gear, and the higher gear has a smallest BSFC to obtain a desired gear for the transmission 112. At 420, the controller 116 can determine whether the BSFC for the desired gear is less than the BSFC for the current gear by greater than a predetermined threshold. If false, the method 400 can end or return to 404. If true, the method 400 can proceed to 424. At 424, the controller 116 can output an indication to shift the transmission 112 to the desired gear. The method 400 can then end or return to 404 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
    determining, at a controller of a vehicle powered by an engine, the controller including one or more processors, whether a gear shift of a transmission of the vehicle is occurring;
    determining, at the controller, whether both an engine speed and a vehicle speed are stable;
    in response to determining that a gear shift of the transmission is not occurring and after determining that both the engine speed and the vehicle speed are stable, calculating, at the controller, brake specific fuel consumption (BSFC) for each of:
        (i) a current gear of the transmission,
        (ii) a lower gear than the current gear of the transmission, and
        (iii) a higher gear than the current gear of the transmission,
    wherein the transmission is one of a manual transmission and an automatic transmission operating in a manual mode;
    determining, at the controller, which of the current gear, the lower gear, and the higher gear has a smallest BSFC to obtain a desired gear of the transmission; and
    outputting, from the controller, an indication to shift the transmission to the desired gear.

2. The method of claim 1, wherein outputting the indication to shift the transmission to the desired gear is performed when the BSFC for the desired gear is less than the BSFC for the current gear by greater than a predetermined threshold.

3. The method of claim 1, wherein the BSFC for a specific gear is calculated based on a respective engine load for the specific gear and a respective engine speed for the specific gear.

4. The method of claim 3, further comprising receiving, at the controller, measurements indicative of an engine load for the current gear and an engine speed for the current gear.

5. The method of claim 4, further comprising calculating, at the controller, an engine load and an engine speed for each of the lower gear and the higher gear based on the engine load and the engine speed for the current gear.

6. The method of claim 5, wherein the BSFC for each gear is calculated based further on engine temperature.

7. The method of claim 1, wherein calculating the BSFC for each of the current gear, the lower gear, and the higher gear is performed in response to determining that both the engine speed and the vehicle speed are stable.

8. The method of claim 7, wherein the engine speed and the vehicle speed are determined to be stable when each speed has not changed by more than a respective predetermined threshold during a respective predetermined period.

9. The method of claim 1, wherein the lower gear, the current gear, and the higher gear are consecutive gears of the transmission.

10. The method of claim 9, further comprising calculating, at the controller, BSFC for at least one of another lower gear of the transmission and another higher gear of the transmission, the other lower gear being lower than the lower gear and the other higher gear being higher than the higher gear,
    wherein determining the desired gear includes determining which of the current gear, the lower gear, the higher gear, and the at least one of the other lower gear and the other higher gear has a smallest BSFC to obtain the desired gear.

11. The method of claim 1, wherein the indication is provided to a driver of the vehicle via a driver interface.

12. The method of claim 1, wherein the transmission is the automatic transmission operating in the manual mode, and wherein the indication causes the automatic transmission to automatically shift to the desired gear.

13. A method, comprising:
    determining, at a controller of a vehicle powered by an internal combustion engine, the controller including one or more processors, whether a gear shift of a transmission of the vehicle is occurring, wherein the transmission is a manual transmission or an automatic transmission operating in a manual mode;

determining, at the controller, whether both an engine speed and a vehicle speed have not changed by more than respective predetermined thresholds during respective predetermined periods in response to determining that the gear shift of the transmission is not occurring;

calculating, at the controller, brake specific fuel consumption (BSFC) for each of (i) a current gear of the transmission, (ii) a lower gear than the current gear of the transmission, and (iii) a higher gear than the current gear of the transmission, in response to determining that the both the engine speed and the vehicle speed have not changed by more than respective predetermined thresholds during respective predetermined periods;

determining, at the controller, which of the current gear, the lower gear, and the higher gear has a smallest BSFC to obtain a desired gear for the transmission; and outputting, from the controller, an indication to shift the transmission to the desired gear when the BSFC for the desired gear is less than the BSFC for the current gear by greater than a predetermined threshold.

14. The method of claim 13, further comprising:

receiving, at the controller, measurements indicative of (i) an engine load for the current gear, (ii) an engine speed for the current gear, and (iii) a temperature of the engine; and calculating, at the controller, an engine load and an engine speed for each of the lower gear and the higher gear based on the engine load and the engine speed for the current gear, wherein the BSFC for a specific gear is calculated based on (i) a respective engine load for the specific gear, (ii) a respective engine speed for the specific gear, and (iii) the temperature of the engine.

15. The method of claim 13, wherein the lower gear, the current gear, and the higher gear are consecutive gears of the transmission.

16. The method of claim 15, further comprising calculating, at the controller, BSFC for at least one of another lower gear of the transmission and another higher gear of the transmission, the other lower gear being lower than the lower gear and the other higher gear being higher than the higher gear, wherein determining the desired gear includes determining which of the current gear, the lower gear, the higher gear, and the at least one of the other lower gear and the other higher gear has a smallest BSFC to obtain the desired gear.

17. The method of claim 13, wherein at least one of (i) the indication is provided to a driver of the vehicle via a driver interface and (ii) when the transmission is the automatic transmission operating in the manual mode, the indication causes the automatic transmission to automatically shift to the desired gear.

* * * * *